United States Patent [19]

Kohl et al.

[11] 4,411,849

[45] Oct. 25, 1983

[54] METHOD FOR FORMING A PLURALITY OF OBJECTS FROM A PLURALITY OF SUPERIMPOSED SHEETS

[75] Inventors: Lou Kohl, Palatine; John R. Peschke, Woodstock; Sheldon M. Wecker, Libertyville, all of Ill.

[73] Assignee: James River-Dixie/Northern, Inc., Greenwich, Conn.

[21] Appl. No.: 289,388

[22] Filed: Aug. 3, 1981

[51] Int. Cl.³ .................... B29D 27/00; B29H 21/04
[52] U.S. Cl. .................................. 264/45.5; 264/48; 264/53; 264/130; 264/159; 264/321
[58] Field of Search ............... 264/321, 103, 159, 53, 264/48, 45.5, 130

[56] References Cited

U.S. PATENT DOCUMENTS

| | | | |
|---|---|---|---|
| 2,450,436 | 10/1948 | McIntire | 264/53 |
| 3,309,440 | 3/1967 | Kracht | 264/321 X |
| 3,311,681 | 3/1967 | Cherney et al. | 264/48 |
| 3,339,006 | 8/1967 | Collins | 264/321 |
| 3,346,686 | 10/1967 | Collins | 264/321 X |
| 3,396,062 | 8/1968 | White | 264/321 X |
| 3,678,546 | 7/1972 | Matsugu et al. | 264/321 X |
| 3,972,664 | 8/1976 | Fillmann | 425/130 |
| 4,062,712 | 12/1977 | Stark | 264/159 X |

OTHER PUBLICATIONS

"Webster's New Collegiate Dictionary", Springfield, Mass., G. & C. Merriam Co., ©1961, pp. 206, 471, 852 and 915.

*Primary Examiner*—Philip E. Anderson
*Attorney, Agent, or Firm*—Bianchi & White

[57] ABSTRACT

A process is provided for forming a plurality of objects simultaneously from a plurality of superimposed sheets of deformable and fusible material comprising the steps of heating said plurality of superimposed sheets until said material in said sheets reaches a temperature sufficient to allow plastic deformation while maintaining time, temperature and pressure conditions at the contiguous faces thereof below those causing fusion of said material and forming said plurality of superimposed sheets simultaneously.

18 Claims, 5 Drawing Figures

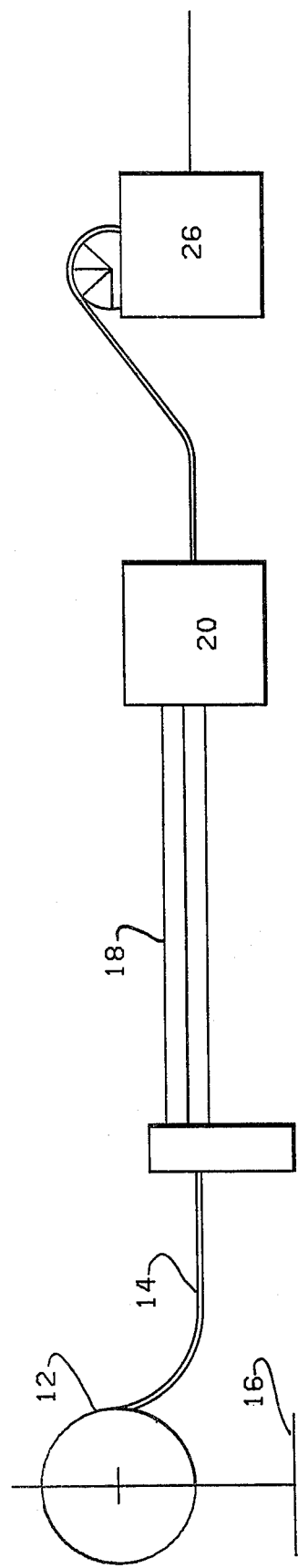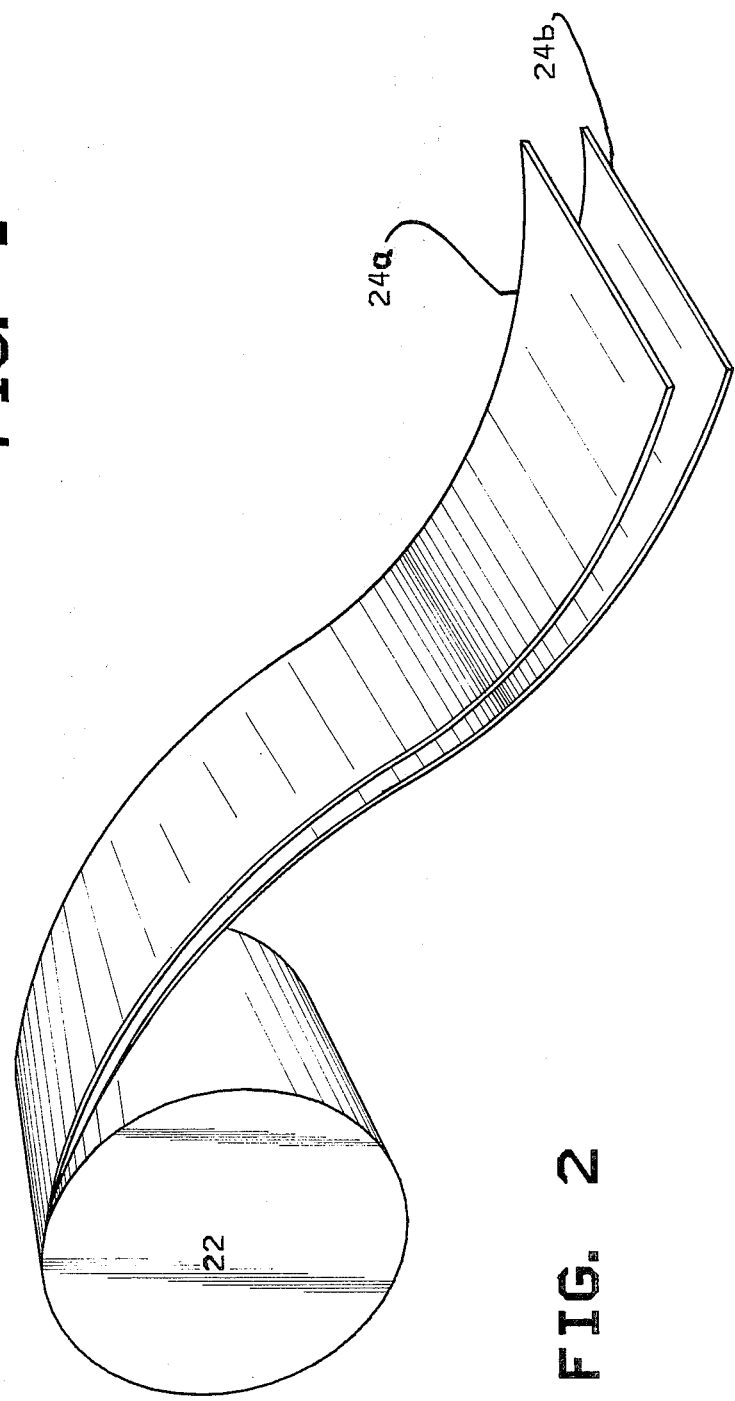

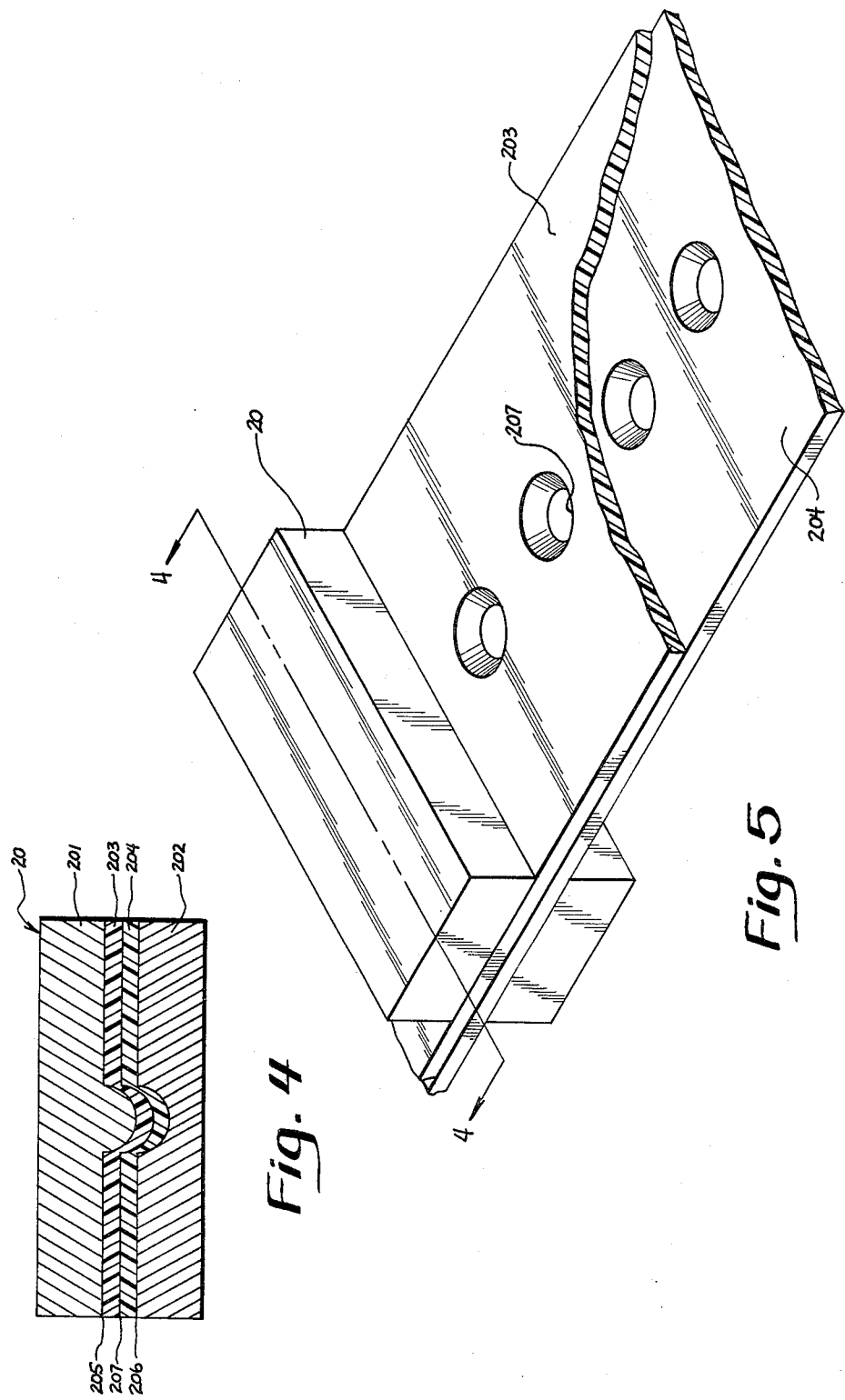

METHOD FOR FORMING A PLURALITY OF OBJECTS FROM A PLURALITY OF SUPERIMPOSED SHEETS

BACKGROUND OF THE INVENTION

The present invention relates generally to a method of forming a plurality of objects from a plurality of superimposed sheets. More particularly, it pertains to the method of producing multiple articles from a plurality of sheets of material, such as foamed polystyrene, which generally fuse when heated and pressed in a forming mold.

The preferred embodiment of the present invention is described particularly with relation to thermoplastic materials such as foam polymers (polystyrene, polyethylene, polypropylene) and solid polymers (polystyrene, polyolefins, polyester), but it is to be understood that it is equally applicable to other formable materials which generally fuse contiguous faces thereof under the contact times, temperatures and pressures involved in the forming process. A typical material used in the instant method is foamed polystyrene sheet, which may have a laminated skin, an extrusion coated skin, or a skin formed on its surface by a process, described in detail in the U.S. Pat. No. 3,311,681 issued to Cherney, et.al.

Further, the term "sheet" as used herein is meant to designate an article having two surfaces larger in area than any other single surface of the article. This definition is meant to include thin, flexible sheets of foam plastic, either flat (i.e., the planes in which each large surface lies are parallel to one another) or in some other shape.

Flexible foamed polystyrene sheet is typically produced by heating a mixture of polystyrene and a foam cell size controlling additive (e.g., talc or a mixture of citric acid and sodium bicarbonate) to a fluid, plastic state in an extruding machine. A liquid which will vaporize to form a gas at extrusion die temperatures and atmospheric pressure is added to the mixture. This expansible fluid mass is then extruded through an orifice or die opening where foaming of the plastic takes place to form a foamed polystyrene sheet.

In many applications, a skin is provided on the surface of the foam to give the foam a superior outer appearance, provide resistance to surface abrasion or add structural strength. Numerous techniques have been described in the prior art for producing skins on the foam, such as combining dual melt streams, one of which contains a foaming agent (developed by National Rubber Machine a Corporation of Tallmadge, Ohio); see U.S. Pat. No. 3,972,664 issued to Fillmann. Another approach includes surface chilling of the foam during the extrusion process. In the Cherney method, an air ring is provided proximate the extrusion orifice to chill one surface of the foam sheet as it is extruded to create a skin thereon. (U.S. Pat. No. 3,311,681 issued to Cherney et.al.) Most recently, in applicant's co-pending application, Ser. No. 264,574, filed May 18, 1981, means are disclosed for producing a skinned foam wherein a nucleating agent is omitted from one stream of a multiple polymer stream, and temperature control of said stream is provided to prevent homogeneous nucleation.

In the industry, these thermoformable thermoplastic materials are generally extruded and the resulting sheets wound into feeder rolls. Typically this rolled sheet will be mounted on an unwind stand and arranged to feed a thermoformer such as the "THERMOPHASER", manufactured by Irwin Research and Development, Inc. From the unwind stand it is fed to a heat tunnel having spaced heating elements positioned therein. Once heated it is selectively and incrementally advanced to a press mold where the deformable sheet is press formed into the desired object. In the final sequence, generally referred to as the trimming operation, the sheet is selectively moved to a trimming apparatus where dies cut the finished product from the stock. Other thermoforming systems available for similar use are the CMS Thermoformer from Gloucester Engineering Company, Inc., and the Continuous Thermoforming Machine from Brown Machinery, a Leesona Co.

It is a characteristic of the thermoplastic polymers that the application of heat softens the material. In this softened state, these materials will commonly fuse with other contiguous surfaces. For a particular material pair, a time, temperature and pressure relationship determines the fusing tendency. This property is used to advantage in many commercial applications. For example, sheets of paper, metal foil, or polystyrene can be fused to polystyrene foam sheet by applying heat and pressure for sufficient time. Twin sheet forming of hollow products has been accomplished in other industries such as in the formation of gas tanks where two sheets of material are heated separately and formed in a hollow mold. A gas is used to form the two sheets against the opposite mold surfaces, while mold pressure outside the cavity area fuses the sheets where they contact each other.

Materials that will not fuse together have been formed in multiple sheets; for example, paper plates are molded and trimmed from multiple sheets. However, since multiple layers of foam are generally fused together when an elevated temperature is combined with applied pressure under usual pressure molding conditions, it has been a practice in the prior art to feed these plastic materials through the thermoformer machines one sheet at a time. Multiple sheet forming of fusible materials has generally not been attempted due to the presumed risk of fusing the sheets during the hot forming process even though multiple sheet forming clearly presents an economical and efficient method for increasing the capacity of the machinery employed.

In the prior art, the multiplicity of parts per stroke required was commonly achieved with a multiplicity of die cavities. When fed with a single sheet, multiple parts per stroke were achieved but only one part per cavity. With the present invention a multiplicity of die cavities may still be used, resulting in multiple parts per stroke as well as multiple parts per cavity.

SUMMARY OF THE INVENTION

Accordingly, it is the primary aim of the present invention to provide a method for the multiple forming of objects from a plurality of superimposed sheet material having as a characteristic of the material a tendency to fuse under high pressure and temperature conditions.

It is further an object of the present invention to provide a method for the forming of multiple items from a plurality of superimposed sheets which are easily separable after the trimming process.

It is still a further object of the present invention to provide a method for the manufacture of multi-ply formed objects from a plurality of superimposed plastic sheets such as foamed polystyrene.

It is yet another object of the present invention to provide a method for the manufacture of multi-ply formed objects from a plurality of superimposed sheet material where such material is of a foamed plastic material having a skin surface formed thereon.

It is still a further object of the present invention to provide means for forming an interleaved feed roll arranged for continuous feeding into a thermoformer for the thermomolding of the product.

Numerous other objects and advantages of the invention will be apparent from the following description, which, taken in connection with the accompanying drawings and claims, discloses a preferred embodiment thereof.

Generally, the aforementioned objects are accomplished by generating extruded foam sheets, winding the extruded sheet into multiple ply rolls, and feeding the multiple ply rolls through a heating oven and into a forming mold press. The temperature in the oven and the pressures at the press are coordinated to provide adequate temperature and pressure in combination with sufficient press time to form the multiple layers fed therethrough. At the same time, these variables are kept sufficiently below the fusing condition within the product area of the sheet to permit separation of the multiply formed product upon trimming from the stock.

Referring to the drawings:

FIG. 1 is a block diagram of a thermoforming system used in conjunction with the present invention;

FIG. 2 is a perspective view of an interleaved roll of sheet material for use with the system shown in FIG. 1.

FIG. 4 is a cross sectional view of the forming step in the thermoforming process of the present invention; and FIG. 5 is a partially cutaway view of the end product formed by the process of the present invention.

DESCRIPTION OF THE PREFERRED EMBODIMENT

Figure 3:
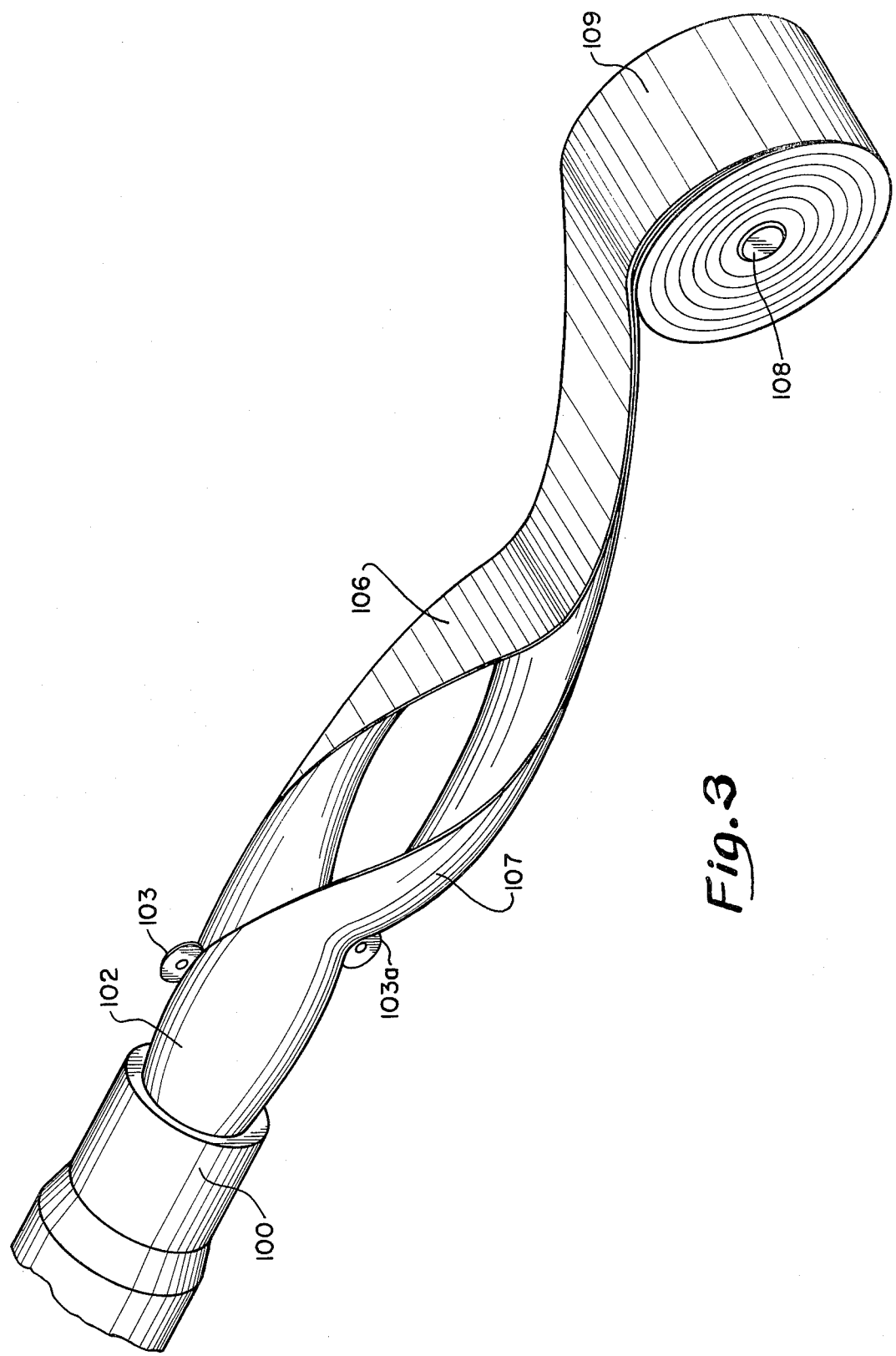
FIG. 3 is a pictorial view of the polystyrene foam extrusion, slitting and winding process.

In the preferred or exemplary embodiment of the instant invention, a roll 12 of formable material 14, such as polystyrene foam, is mounted on an unwind stand 16 from which it is fed to a heating oven 18 of a thermoforming machine. From there it is incrementally fed to a pressure forming mold 20 having contoured plates therein to apply pressure upon the stock material within the mold. In the preferred embodiment of the present invention, a roll 22 (FIG. 2) of multiple plies 24a and 24b are fed from the unwind stand into the thermoforming machine. Alternatively, this multiple ply roll could be functionally replaced with multiple rolls of single ply (not shown) mounted in alignment on a multiple roll capacity unwind stand and unwound simultaneously.

Generation of multiple ply rolls of plastic is accomplished by first extruding a plastic cylinder, such as described in the U.S. Pat. No. 3,311,681 issued to Cherney, et.al., and by slitting the cylinder into multiple sheets. (Cherney, et.al. refers to the cylinder as a closed tube formed as it leaves an orifice of the extrusion head.) FIG. 3 shows the extruded cylinder or closed tube being cut by slitters 103 and 103a to form two sheets 106 and 107. These are then superimposed and wound on a single winder 108 to form an interleaved roll 109. An alternative method is to take the output of multiple extrusion devices and wind the multiple sheets upon a single core in an interleaved fashion.

The thermoforming systems used with the instant invention may include, for example, machines such as the Thermophaser system available from Irwin Research and Development, Inc., the CMS Thermoformer from Gloucester Engineering Company, Inc., and the Continuous Thermoforming Machine from Brown Machinery, a Leesona Company. In a conventional system a roll of single ply material, such as sheet polystyrene foam, is placed on an unwind stand and arranged to continuously feed the sheet into a temperature controlled oven. This oven is arranged to accept the incrementally fed material and, through heating elements spaced about the interior thereof, raise the temperature of the stock material high enough to allow plastic forming. Generally the elements are specific wattage elements placed on approximately two inch centers and controlled to bring the sheet material conveyed therethrough to an even temperature throughout.

Once a temperature high enough to allow molding is achieved, the double sheet 203 and 204 is incrementally fed into the mold press where a contoured plate 205, air pressure, or vacuum is used to form the sheet against a mating contoured plate 206. For example, if foam mealservice, such as a foam plate 207, is being produced, a convex surface is commonly provided on one side of the mold while a matching concave surface is provided opposite thereto, and the polystyrene foam sheet is pressed to the form of the mold between these surfaces. The formed portion of the sheet is cooled and trimmed out with cutting apparatus 26 to form the final product while the outer margins thereof are scrapped.

The improved process of the present invention utilizes the thermoforming device aforementioned, but incorporates therein the process steps of feeding multiple layers of sheet material simultaneously into the oven where the sheet temperature is raised sufficiently to permit forming. By strictly controlling the oven temperature relative to the pressure (clearance) in the mold press, a temperature suitable for plastic forming is obtained. This temperature is selected to maintain the condition at the contiguous faces of the sheet material cool enough to avoid fusing within the mold.

The fusing characteristic of thermoplastic material is dependent upon three elements: the temperature of the material at the contiguous faces, the pressure applied at those faces, and the length of time the temperature and pressure is held. By controlling the oven temperature and heating time, the gap between the surfaces of the forming mold and the time during which pressure is applied (the speed of operation), the tendency to fuse may be controlled.

In tests that have been run on the Irwin Research and Development, Inc., Thermophaser system, two sheets of laminated skinned polystyrene foamed sheet were fed into the Thermophaser system. The heating elements in the oven were set as follows: top heater elements 695 degrees Fahrenheit; bottom heater elements, 635 degrees Fahrenheit; top side heater elements, 605 degrees Fahrenheit; and bottom side heater elements, 525 degrees Fahrenheit. The mold gap was set at 0.090 inches and the forming rate was set at 20 strokes per minute. As a result of this run, the molded objects were found to be easily separable and were not fused together.

In another example of the present invention, two sheets of air ring skinned polystyrene foam were fed through an oven having all temperatures set to 565 degrees Fahrenheit. Molded objects were formed at an operation speed of 15 strokes per minute, and did not fuse together. When this experiment was repeated using oven temperatures of 500 degrees Fahrenheit, the sheet was not sufficiently heated to form properly. When repeated, using oven temperatures of 650 degrees Fahrenheit, articles were well formed, but the contiguous sheets were fused.

In yet another example, a solid high impact polystyrene was molded in a Comet laboratory former. Two sheets of a polystyrene of 0.045 inch caliper were heated and formed simultaneously. When formed with a sheet temperature of 230 degrees Fahrenheit and 241 degrees Fahrenheit, no fusing resulted. When formed at 253 degrees Fahrenheit, it was found that the polystyrene sheets began to fuse together. To prevent this fusing and to enlarge the time/temperature/pressure window for forming, a releasing agent, as for example a food grade silicone lubricant (Sherwin Williams "Sprayon 00210"), was applied to the contiguous faces of the plastic. In a further aspect of the present invention, the releasing agent used to enlarge the time/temperature/pressure window for forming may be applied to the foam surface through addition to the air stream used to cool, or form skins on, the foam sheet during the extrusion process.

An inherent problem in the forming of multiple sheets is the maintaining of registration through the cooling process as the sheets are conveyed to the trimmer. There the trimming dies are arranged to trim the multiple sheets with one stroke so that any deviation in registration will cause considerable waste and product defects. Accordingly, in a further aspect of the present invention, it has been found that by increasing the temperature of pressure during the forming operation only in the areas outside of the product area, (e.g., the margin of the sheet stock material), selective fusing can be obtained. This provides secure registration of the multiple layers as they are conveyed through the cooling area to the trimming machinery.

While this invention has been described in connection with a preferred embodiment and procedure, it will be understood that we do not intend to limit the invention to that embodiment or procedure. On the contrary, we intend to cover all alternatives, modifications and equivalents as may be included within the spirit and scope of the invention as defined by the appended claims. More particularly, it is clear that many equivalent materials may be molded in the present multiple sheet method herein disclosed which heretofore were not so molded due to their tendency to fuse. The shaped objects most commonly formed with the machinery and method disclosed herein are generally considered to be low draw ratio objects such as plates, food trays, auto headliners and speciality insulation. Other objects, which either have a low draw ratio or which when multi-ply pressed are sufficiently similar to pass as commercially acceptable in the trade, may also be processed according to the instant invention.

Generally there has been shown and described an improved method for increasing the production of press formed objects from fusible sheet material. There is provided a process for forming a plurality of superimposed sheets wherein said sheets are heated to allow plastic deformation while the time/temperature/pressure factors are maintained below the fusing point of the material.

We claim:

1. A process for forming a plurality of stacked objects simultaneously from a plurality of separable superimposed sheets of deformable and fusible material comprising the steps of heating said plurality of separable superimposed sheets until said material in said sheets reaches a temperature sufficient to allow plastic deformation while maintaining molding conditions at the contiguous surfaces thereof below those resulting in fusing of portions of said contiguous surfaces and forming said plurality of separable superimposed sheets simultaneously to form a plurality of stacked objects.

2. The process of claim 1 further comprising the step of positioning multiple rolls of separable sheet material in alignment for continuous feeding, superimposing said separable sheets from said multiple rolls and continuously feeding said registered separable superimposed plurality of sheets for said heating and forming steps.

3. The process of claim 2 further comprising the step of coating the contiguous surfaces of said separable sheet material with a releasing agent whereby higher forming temperatures, pressures or times are achievable without fusing portions of said contiguous surfaces.

4. The process of claim 1 further comprising the step of first forming a roll of interleaved separable sheet material having a plurality of separable sheet material interleaved therein by superimposing multiple sheets of separable material in aligned registration and rolling same about a common axis, and feeding said separable interleaved sheet material from said roll for said heating and forming steps.

5. The process of claim 4 further comprising the steps of extruding a tubular foamed plastic cylinder, slitting said extruded cylinder to form separable multiple sheets thereof, superimposing said separable multiple sheets, and winding said separable multiple sheets onto a single core to produce an interleaved roll of separable foamed plastic sheets for continuous feed to said heating and forming steps.

6. The process of claim 5 further comprising the step of coating the contiguous surface of said extruded foam sheet wiht releasing agent prior to forming said sheet.

7. The process of claim 1 further comprising the step of applying increased pressure to selected portions of said plurality of heated separable sheet material to cause selected fusing of the contiguous surfaces at said selected portions of said separable plurality of superimposed sheet material for securing said sheets in registration.

8. The process of claim 7 further comprising the steps of cooling said formed selectively fused superimposed sheets and trimming said superimposed sheets, to yield a plurality of formed stacked objects.

9. The process of claim 5 further comprising the step of extruding foamed polystyrene sheet and forming skins on the surface of the foam sheet by means of cooling said surface with a cooled gas flow, and coating the surface of said extruded foamed polystyrene sheet with releasing agent by injecting said releasing agent with said gas flow.

10. The process of claim 7 further comprising the steps of first forming a multiple ply roll of separable foamed plastic sheets for continuous feed of a thermoforming machine comprising the steps of extruding a tubular plastic cylinder, slitting said tubular cylinder to form multiple sheets thereof, superimposing said multiple sheets in aligned registration, and winding said separable multiple sheets onto a single core to produce an interleaved roll of separable foamed plastic sheets.

11. The process of claim 7 further comprising the steps of first forming a multiple ply roll of separable plastic sheets for continuous feed of a thermoforming machine comprising the steps of extruding multiple sheets of plastic from a plurality of extrusion stations, superimposing said multiple sheets in aligned registration, and winding said multiple sheets upon a single core to produce an interleaved roll of separable plastic sheets.

12. A process for forming two stacked objects simultaneously from two superimposed sheets of deformable and fusible material comprising the steps of heating said two separable superimposed sheets until said material in said sheets reaches a temperature sufficient to allow plastic deformation while maintaining molding conditions at the contiguous surfaces thereof below those resulting in fusing of portions of said contiguous surfaces and forming said two separable superimposed sheets simultaneously to form two stacked objects.

13. The process of claim 12 further comprising the step of coating the contiguous surfaces of said sheet material with a releasing agent whereby higher forming temperatures, pressures or times are achievable without fusing.

14. The process of claim 12 further comprising the step of first forming a roll of interleaved sheet material having two sheets of material interleaved therein by superimposing two sheets of separable material in aligned registration and rolling same about a common axis, and feeding said interleaved sheet material from said roll for said heating and forming steps.

15. The process of claim 14 further comprising the steps of extruding a tubular foamed plastic cylinder, slitting said extruded cylinder to form two sheets thereof, superimposing said two sheets, and winding said sheets onto a single core to produce an interleaved roll of separable foamed plastic sheets for continuous feed to said heating and forming steps.

16. The process of claim 15 further comprising the step of coating the contiguous surfaces of said extruded foam sheet with releasing agent prior to forming said sheet.

17. The process of claim 12 further comprising the step of applying increased pressure to selected portions of said heated sheet material to cause selected fusing of the contiguous surfaces at said selected portions of said separable superimposed sheet material for securing said sheets in registration.

18. The process of claim 17 further comprising the steps of cooling said formed superimposed selectively fused sheets and trimming said superimposed sheets to yield a plurality of formed stacked objects.

* * * * *